(12) United States Patent
Bae et al.

(10) Patent No.: US 7,685,087 B2
(45) Date of Patent: Mar. 23, 2010

(54) METHOD FOR MAKING DECISION TREE USING CONTEXT INFERENCE ENGINE IN UBIQUITOUS ENVIRONMENT

(75) Inventors: Jung-Sook Bae, Daejeon (KR);
Kyung-Sook Kim, Daejeon (KR);
Gyung-Chul Shin, Daejeon (KR);
Won-Don Lee, Daejeon (KR);
Dong-Hee Kim, Gwangju (KR)

(73) Assignees: Electronics and Telecommunications Research Institute, Daejeon (KR); The Industry & Academic Cooperation in Chungnam National University, Daejeon (KR)

( * ) Notice: Subject to any disclaimer, the term of this patent is extended or adjusted under 35 U.S.C. 154(b) by 355 days.

(21) Appl. No.: 11/635,794

(22) Filed: Dec. 8, 2006

(65) Prior Publication Data
US 2007/0136223 A1    Jun. 14, 2007

(30) Foreign Application Priority Data
Dec. 9, 2005   (KR) ...................... 10-2005-0120824
May 15, 2006   (KR) ...................... 10-2006-0043480

(51) Int. Cl.
*G06N 5/02* (2006.01)
(52) U.S. Cl. ........................... 706/46; 706/45
(58) Field of Classification Search ............ 706/46, 706/45
See application file for complete search history.

(56) References Cited

U.S. PATENT DOCUMENTS 6,301,579 B1 * 10/2001 Becker ........................ 707/102
7,292,152 B2 * 11/2007 Torkkola et al. ............ 340/576
2004/0024773 A1 *  2/2004 Stoffel et al. ................ 707/102

FOREIGN PATENT DOCUMENTS

KR   1020020077671   10/2002

OTHER PUBLICATIONS

"Induction of Decision Trees", J. R. Quinlan, Machine Learning 1986, pp. 81-106.*
Kohavi et al.; "Decision Tree Discovery"; Updated Oct. 10, 1999; pp. 1-16.
Lee et al.; "A Dynamic Feature Weighting Method for Case-based Reasoning"; Journal of Korea Intelligent Information Systems Society; Jun. 2001; vol. 7, No. 1; pp. 47-59, 61.

* cited by examiner

*Primary Examiner*—David R Vincent
*Assistant Examiner*—Mai T Tran
(74) *Attorney, Agent, or Firm*—Lowe Hauptman Ham & Berner, LLP (57) ABSTRACT

The present invention relates to a method for generating a decision tree using an inference engine in a ubiquitous environment. In the method, a data table for a data event set is generated based on information collected by at least one sensor. Subsequently, a weight value of the data event set is established, and an entropy is calculated based on the established weight value (here, the entropy is a scale for classifying the information collected by the sensor into respective classes). In addition, the decision tree for the collected information is formed based on the calculated entropy.

9 Claims, 6 Drawing Sheets

FIG.6

METHOD FOR MAKING DECISION TREE USING CONTEXT INFERENCE ENGINE IN UBIQUITOUS ENVIRONMENT

CROSS-REFERENCE TO RELATED APPLICATION

This application claims priority to and the benefit of Korean Patent Application Nos. 10-2005-0120824 filed in the Korean Intellectual Property Office on Dec. 9, 2005, and 10-2006-0043480 filed in the Korean Intellectual Property Office on May 15, 2006, the entire contents of which are incorporated herein by reference.

BACKGROUND OF THE INVENTION (a) Field of the Invention

The present invention relates to an inference engine, and more particularly relates to a method for generating a decision tree by adaptively inferring desired results based on a current situation by using an inference engine in a ubiquitous environment.

(b) Description of the Related Art

In general, knowledge systems including an expert system emulate inference performed by an expert. The knowledge system typically uses an inference engine to interpret an expert's knowledge that is encoded and stored in a knowledge base. In addition, the expert system uses the expert's knowledge to solve difficult problems, and the inference engine is a core part of the expert system.

To infer a low data context sensed by a plurality of sensors in the knowledge system and input it to the knowledge system, reasoning mechanisms including a first order logic, a temporal logic, and a fuzzy logic, or learning mechanisms including a Bayesian network, a neural network, and a reinforcement learning have been conventionally used. The above mechanisms have problems of speed and memory in a mobile communication ubiquitous environment. Particularly, when a new sensor is additionally provided to a knowledge system, various problems and limited conditions may occur.

In addition, an algorithm C4.5 that is widely used to generate a decision tree of the inference engine may process an unknown value (i.e., a missing value). However, when a data event set additionally having a new attribute is input to the system, it has no appropriate solution for processing the unknown value.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for inferring a low level data context that is input from sensors as a high level context by using a decision tree in a ubiquitous environment.

In addition, the present invention has been made in an effort to provide an entropy measure to express data that are expanded from data of C4.5, and to form a tree corresponding to the expanded data.

In an exemplary method for forming a decision tree by using an inference engine in a ubiquitous environment having a plurality of sensors, a) a data table for a data event set is based on information collected by at least one sensor, b) a weight value of the data event set is established and entropy is calculated based on the established weight value (here, the entropy is a scale for classifying the information collected by the sensor into respective classes), and c) the decision tree for the collected information is formed based on the calculated entropy.

In an exemplary method for updating a decision tree by using an inference engine in a ubiquitous environment having a plurality of sensors, a) data are collected from at least one second sensor while a first decision tree is formed based on attributes of data collected from at least one first sensor, b) a weight value for the new attribute is established when a new attribute is generated from the data collected from the second sensor, c) a data table for the data collected from a second sensor having the attribute having the established weight value is generated, d) a final data table is generated based on the data table generated in c) and a data table for the first decision tree, and e) a second decision tree for the data collected from the first and second sensors based on the final data table is generated.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

A great number of autonomous agents are required to change a physical space to a smart and interactive space in a ubiquitous environment. A method for inferring a high level context by using a low level context received from sensors is required in the ubiquitous environment including a plurality of agents.

The low level context indicates data collected by the sensor, and the high level context indicates secondary data appropriately formed for a user who wants to use the data collected by the sensor. Before describing the inferring method, a method for forming a decision tree by using a conventional data set will be described with reference to FIG. 1 to FIG. 3.

The decision tree is a tree-shaped decision making set obtained by generating a rule for analyzing recodes of data collected by a sensor and classifying the analyzed recodes.

Figure 1:
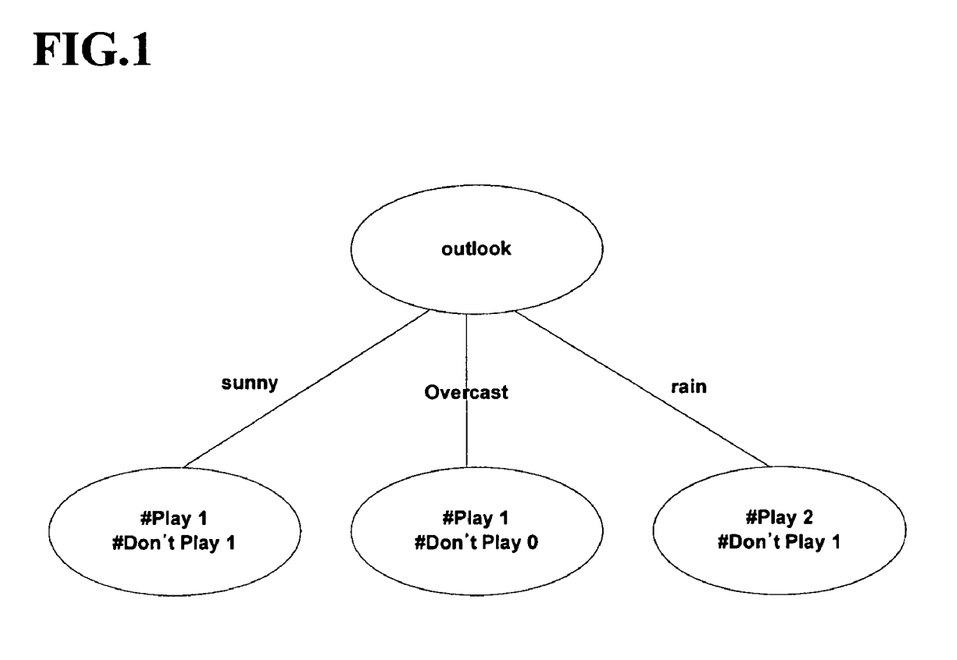
FIG. 1 shows a diagram of an example of a decision tree after finishing a first process for forming the decision tree by using a conventional data set.
Figure 2:
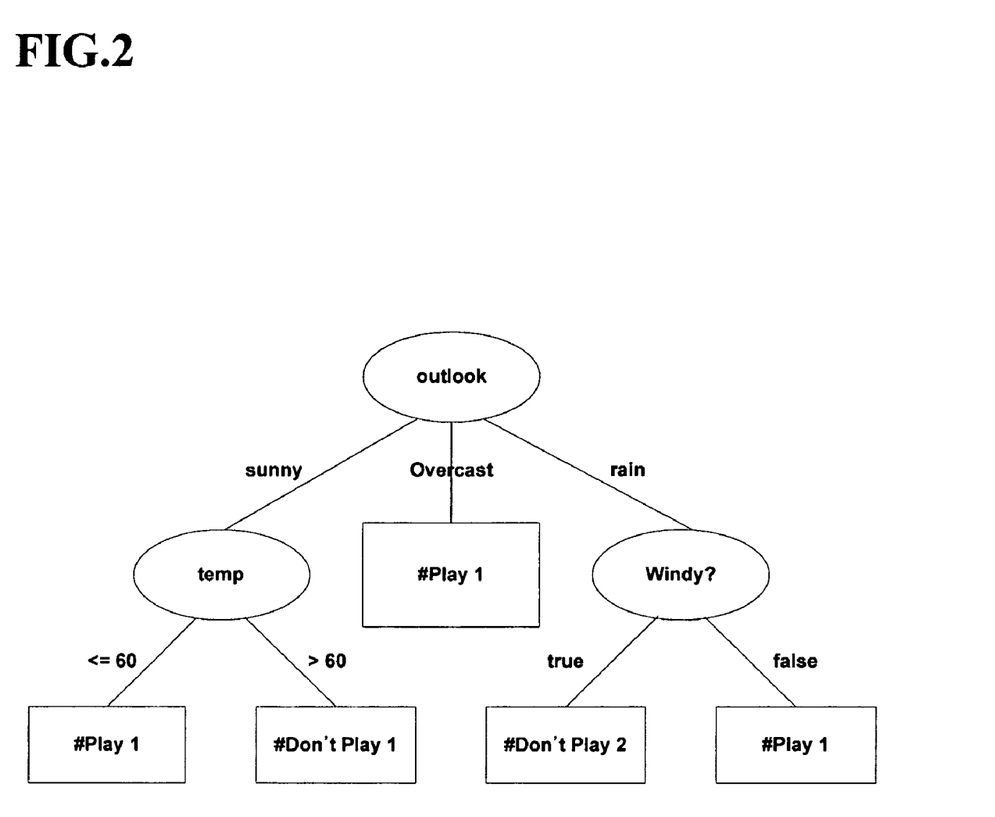
FIG. 2 shows a diagram of a decision tree formed by using the conventional data set.

FIG. 1 shows a diagram of an example of a decision tree after finishing a first process for forming the decision tree by using a conventional data set. FIG. 2 shows a diagram of a decision tree formed by using the conventional data set.

Before describing the decision tree shown in FIG. 1, a method for defining a data event set by using the low level context formed by quantizing analog data input from the sensor into digital data will be described.

In an exemplary embodiment of the present invention, data collected in the ubiquitous environment including three sensors (an outlook sensor, a temperature (temp) sensor, and a wind sensor) are exemplified, but are not limited thereto. According to the exemplary embodiment of the present invention, three attributes including "outlook", "temp", and "windy?" are generated based on information collected from the outlook sensor, the temperature sensor, and the wind sensor. The attribute indicates a distinguisher for distinguishing information collected by the sensor.

The "outlook" includes outcome values of "sunny", "overcast", and "rain", the "temp" includes outcome values of "60", "70", and "80", and the "windy?" includes outcome values of "true" and "false". That is, the outlook sensor collects weather information of "sunny", "overcast", and "rain", and it has the outcome values of "sunny", "overcast", and "rain" based on the weather information.

The temperature sensor divides sensed external temperatures as ranges of 60, 70, and 80 degrees Fahrenheit. The wind sensor collects information on whether it is windy or not, and sets the information as values of "true" and "false".

Classes of the data have a value "Play" and a value "Don't Play". The class is an outcome value indicating whether outdoor activity is possible based on the data collected by the plurality of sensors according to the exemplary embodiment of the present invention. Here, the respective attribute values, outcome values according to the attribute values, and data classes are not limited to the above values.

The outlook and the class are nominal attributes, and the temperature is a numerical attribute. It is assumed that a decision tree is formed as Table 1 based on the attribute values, the outcomes, and the classes.

TABLE 1

| Outlook | Temp(° F.) | Windy? | Class |
| --- | --- | --- | --- |
| sunny | 70 | false | Don't Play |
| sunny | 60 | true | Play |
| overcast | 80 | false | Play |
| rain | 60 | true | Don't Play |
| rain | 70 | false | Play |
| rain | 80 | true | Don't Play |

The class values are data according to the exemplary embodiment of the present invention, but are not limited to those shown in Table 1. Values of "sunny", "70", and "false" are one example of a tuple.

Table 2 is formed by using the data shown in Table 1, so as to flexibly using the data collected by a sensor when the sensor is additionally provided in the ubiquitous environment.

TABLE 2

| Event | Outlook | | | Temp(° F.) | | | Windy? | | Class | |
| --- | --- | --- | --- | --- | --- | --- | --- | --- | --- | --- |
| # | sunny | overcast | rain | 60 | 70 | 80 | true | false | Play | Don't Play |
| 1 | 1 | 0 | 0 | 0 | 1 | 0 | 0 | 1 | 0 | 1 |
| 2 | 1 | 0 | 0 | 1 | 0 | 0 | 1 | 0 | 1 | 0 |
| 3 | 0 | 1 | 0 | 0 | 0 | 1 | 0 | 1 | 1 | 0 |
| 4 | 0 | 0 | 1 | 1 | 0 | 0 | 1 | 0 | 0 | 1 |
| 5 | 0 | 0 | 1 | 0 | 1 | 0 | 0 | 1 | 1 | 0 |
| 6 | 0 | 0 | 1 | 0 | 0 | 1 | 1 | 0 | 0 | 1 |

Figure 3:
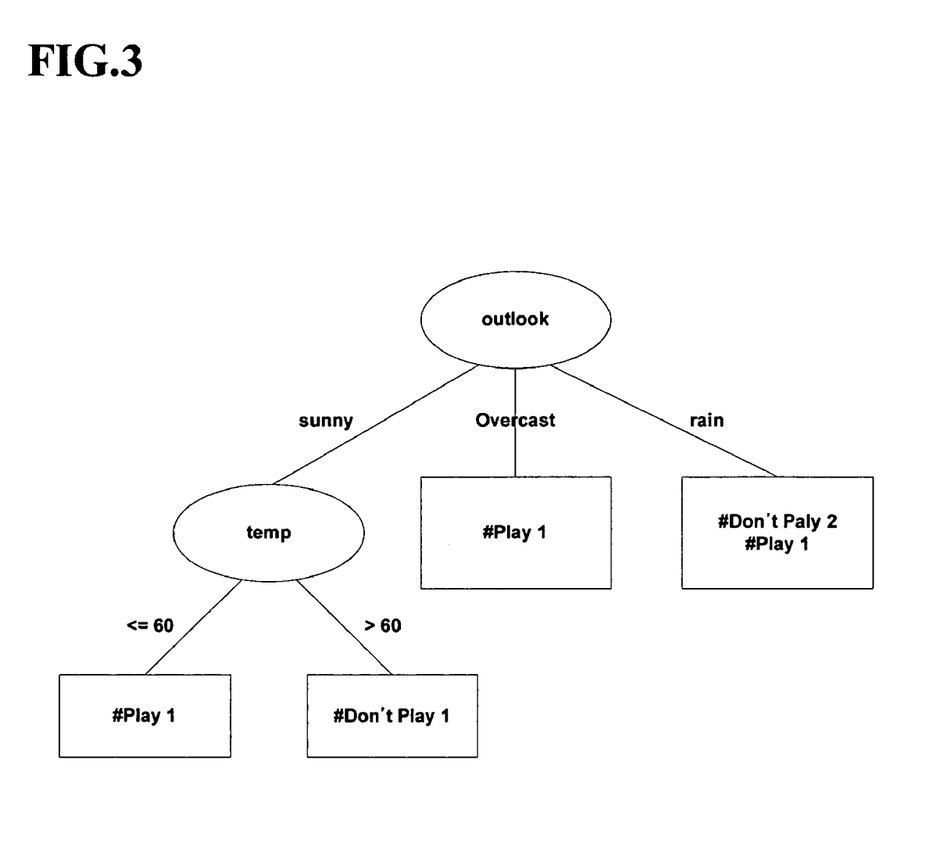
FIG. 3 shows an example for pruning a part of the decision tree formed by using the conventional data set.

A process for forming the decision trees shown in FIG. 1 to FIG. 3 will now be described by using data shown in Table 2. The process for forming the on trees shown in FIG. 1 to FIG. 3 is the same as that of an algorithm C4.5.

To form the decision tree shown in FIG. 1, Gain_ratios (or entropies) are obtained for each attribute. In this case, a Gain_ratio is a ratio of the attribute selected by an entropy-based method, and is selected by the attribute generating the most partitions.

The decision tree is a type of graph as shown in FIG. 1, and among a plurality of nodes, an intermediate node (hereinafter referred to as a decision node) except a terminal node (hereinafter referred to as a leaf node) is a partitioning attribute, and the leaf node is a set of classes partitioned by a path of the decision node. A branch is a partitioning point of the partitioning attribute of the decision node.

The Gain_ratio for each attribute is obtained as described above, and an attribute having the greatest value among the obtained values is determined as an attribute of a test node of the decision tree. A tree is recursively partitioned until respective leaf nodes are set to predetermined classes. In the exemplary embodiment of the present invention, as shown in FIG. 1, the leaf node is set to the value "Don't Play".

When the tree is recursively partitioned, a tree partitioning process may be stopped when the predetermined class is greater than a predetermined percentage which is a threshold value determined by a decision tree designer. In addition, to simplify the tree, the tree may be set such that a node that is greater than a predetermined level is not formed. That is, the tree may be formed according to a predetermined depth.

The Gain_ratio is obtained by an entropy equation given as Equation 1.

The entropy is a value for statistically determining the amount of information of the data signals input through a sensor. That is, the entropy indicates probability distribution of the symbol set forming the corresponding data signal.

$$\text{Gain\_ratio}(A) = \text{Gain}(A)/\text{split\_info}(A) \qquad \text{[Equation 1]}$$

Here, A denotes an attribute.

That is, as shown in Equation 1, an output value is obtained by dividing a gain value of an attribute A by partitioning information value of the attribute A.

To describe elements for obtaining the Gain_ratio(A) of Equation 1, data used for each element will be described first.

T denotes a set of training events.

$C_1, C_2, C_3, \ldots, C_{k-1}$, and $C_k$ respectively denote classes. There are two classes "Play" and "Don't Play" in the exemplary embodiment of the present invention.

An outcome is based on a single attribute, and it is shown as $\{O_{A1}, O_{A2}, O_{A3}, \ldots, O_{A(n-1)}, \text{and } O_{An}\}$. When A is the outlook attribute in the exemplary embodiment of the present invention, the outcome is {sunny, overcast, rain}.

$T_{Aj}$ denotes a subset having an output value j for the single attribute A in a set T. Since the outcome has three values of "sunny", "overcast", and "rain" when the single attribute A is the outlook attribute, the set of training events is divided as three subsets.

freq ($C_i$, T) denotes the number of samples included in the class $C_i$ in the set T, which will be given as follows when the outlook is exemplified in the exemplary embodiment of the present invention.

freq (Play, T)=3, freq (Don't Play, T)=3,
freq (Play, sunny)=1, freq (Don't Play, sunny)=1,
freq (Play, overcast)=1, freq (Don't Play, overcast)=0,
freq (Play, rain)=1. freq (Don't Play, rain)=2

|T| denotes the number of samples. Here, the sample is an event having a weight value of 1.

|$T_{Aj}$| denotes the number of samples of subsets having the outcome value j for the single attribute A in the set T, which will be given as follows when the outlook is exemplified.

|$T_{sunny}$|=2
|$T_{overcast}$|=1
|$T_{rain}$|=3

Elements for obtaining the Gain_ratio(A) based on the above data will now be described.

Gain(A) is obtained by subtracting $info_A(T)$ from info(T), which is determined by Equation 2 and Equation 3.

$$info(T) = -\sum_{i=1}^{k} freq(C_i, T)/|T| \times \log_2(freq(C_i, T)/|T|)$$ [Equation 2]

Here, k denotes the number of classes.

$$info(T_{Aj}) = -\sum_{i=1}^{k} freq(C_i, T_{Aj})/|T_{Aj}| \times \log_2(freq(C_i, T_{Aj})/|T_{Aj}|)$$

$$info_A(T) = \sum_{j=1}^{n} |T_{Aj}|/|T| \times info(T_{Aj})$$ [Equation 3]

split_info(A) is given as Equation 4.

$$slpit\_info(A) = -\sum_{j=1}^{n} |T_{Aj}|/|T| \times \log_2(|T_{Aj}|/|T|)$$ [Equation 4]

By using the above Equations, the Gain_ratio for the outlook attribute is calculated as follow.

$$info(T) = -3/6 * \log_2 3/6 - 3/6 * \log_2 3/6 = 1$$

$$info_{outlook}(T) = 2/6(-1/2 * \log_2 1/2 - 1/2 * \log_2 1/2 +$$
$$1/6(-1/1 * \log_2 1/1 - 0/1 * \log_2 0/1) +$$
$$3/6(1/3 * \log_2 1/3 - 2/3 * \log_2 2/3)$$
$$= 0.7924$$

$$Gain(Outlook) = info(T) - info_{outlook}(T) = 0.2076$$

Accordingly, the Gain_ratio for the outlook is given as Gain_ratio(outlook)=0.2076/1.4591=0.4569.

A method for obtaining a Gain_ratio of the temp having a numerical attribute will now be described. For the numerical attribute, the Gain_ratio is calculated after establishing an optimal threshold. Within the optimal threshold value, the system may not be affected by the network environment change in the ubiquitous environment.

To obtain the optimal threshold value Z, values of the temp attribute are arranged in an ascending order. All values between $V_i$ and $V_{i+1}$ that are used as the threshold value are established as the threshold values, the attribute values arranged in the ascending order are classified in two groups based on the threshold value, and the entropy is obtained. A method for obtaining the entropy is shown in Equation 3.

Since the temp attribute has "60", "70", and "80" in the exemplary embodiment of the present invention, the values may be classified in two groups (60|70, 80) or (60, 70|80). The entropies of the two cases are obtained as follow.

When the values are classified in (60|70, 80), the entropy is given as follows.

| 60 | 70 | 80 |
|---|---|---|
| #Play = 1, #Don't Play = 1 | #Play = 3, #Don't Play = 1 | |

$info_{Temp}(T) = 2/6(-1/2 * \log_2 1/2 - 1/2 * \log_2 1/2) + 4/6(-3/4 * \log_2 3/4 - 1/4 * \log_2 1/4) = 0.9778$ When the values are classified in (60, 70|80), the entropy is given as follows.

| 60 | 70 | 80 |
|---|---|---|
| #Play = 2, #Don't Play = 2 | #Play = 1, #Don't Play = 1 | |

$info_{Temp}(T) = 4/6(-2/4 * \log_2 2/4 - 2/4 * \log_2 2/4) + 2/6(-1/2 * \log_2 1/2 - 1/2 * \log_2 1/2) = 1$ The threshold value in the lowest level among the entropies is established as the optimal threshold value. Since an $info_{Temp}(T)$ value obtained when the attribute values are classified as (60|70, 80) in the exemplary embodiment of the present invention is lower than the $info_{Temp}(T)$ value obtained when the attribute values are classified as (60, 70|80), the optimal threshold value is established as 65. After establishing the optimal threshold value, the Gain_ratio for the temp attribute is calculated, and it is given as follows.

split_info(Temp)=−2/6*$\log_2$2/6−4/6*$\log_2$4/6=0.9183

Accordingly, Gain_ratio=(1−0.9778)/0.9183=0.0241

After obtaining the Gain_ratio for the temp, the Gain_ratio for the windy which is the nominal attribute is obtained. The Gain_ratio of the "windy" according to the exemplary embodiment of the present invention is given as follows.

$$info_{windy}(T) = 3/6(-1/3 * \log_2 1/3 - 2/3 * \log_2 2/3) +$$
$$3/6(-2/3 * \log_2 2/3 - 1/3 * \log_2 1/3)$$
$$= 0.9182$$

$$Gain(Windy) = info(T) - info_{windy}(T) = 0.0818$$

$$split\_ratio(Windy) = -3/6 * \log_2 3/6 * \log_2 3/6 = 1$$

Accordingly, the Gain_ratio for the windy is given as Gain_ratio(Windy)=0.0818/1=0.0818.

Among the Gain_ratios for the three attributes, since the Gain_ratio of the outlook is 0.4569 which is the greatest value, the outlook attribute is selected as the attribute for the test node. FIG. 1 shows a decision tree for the first selected node.

When the process for forming the tree shown in FIG. 1 is recursively performed for all nodes, the decision tress shown in FIG. 2 may be obtained. When there are a plurality of attributes having the same Gain_ratio values, the attribute of the test node is randomly selected, or it is selected according to a priority of the attribute.

Data are tested by using the decision tree. When information of {rain, 90, false} is collected by the sensors, a result of "Play" may be obtained according to the nodes of the decision tree shown in FIG. 2.

That is, in FIG. 2, the outlook node which is a first node of the decision tree is detected, a path "rain" is selected, the windy node is detected, a path "false" is selected, and therefore, a result "play" is obtained. Accordingly, the number of attributes of information collected by the sensor is three, including "rain", "90", and "false", but only two nodes are detected to obtain the result "play".

While two nodes are detected to obtain the result "play" when the decision tree shown in FIG. 2 is used, one node may be detected to obtain the result "play" when a pruned tree is used, which will be described with reference to FIG. 3.

FIG. 3 shows an example for pruning a part of the decision tree formed by using the conventional data set.

In a pruning method, parts that do not have to be detected are detected and eliminated so as to efficiently detect the nodes. In addition, a pruning process is performed without mentioning a training dataset and remote data.

As shown in FIG. 3, a result for the information of {rain, 90, false} collected by the sensors may be obtained by detecting one node when the pruned decision tree is used. That is, the outlook node which is the first node of the decision tree is firstly detected, a path "rain" is selected, and a result "Don't Play" or "Play" may be obtained. Among the results "Don't Play" and "Play", the result "Play" is determined according to a predetermined rule, which will be described when the exemplary embodiment of the present invention is described.

A calculating process for forming the decision trees shown in FIG. 1 to FIG. 3 is the same as that of the algorithm C4.5. In this case, a data entry is filled with a value 0 or 1. However, to use a widely expanded data entry compared to the conventional data entry, a method for forming the decision trees shown in FIG. 4 and FIG. 5 is suggested.

Accordingly, it is suggested that the respective entries are filled with values between 0 and 1, and a method for calculating the entropy by using the suggested data is suggested. Here, the entropy is a measure for classifying a plurality of pieces of information collected by the sensor into the respective classes, and selecting the attribute.

Figure 4:
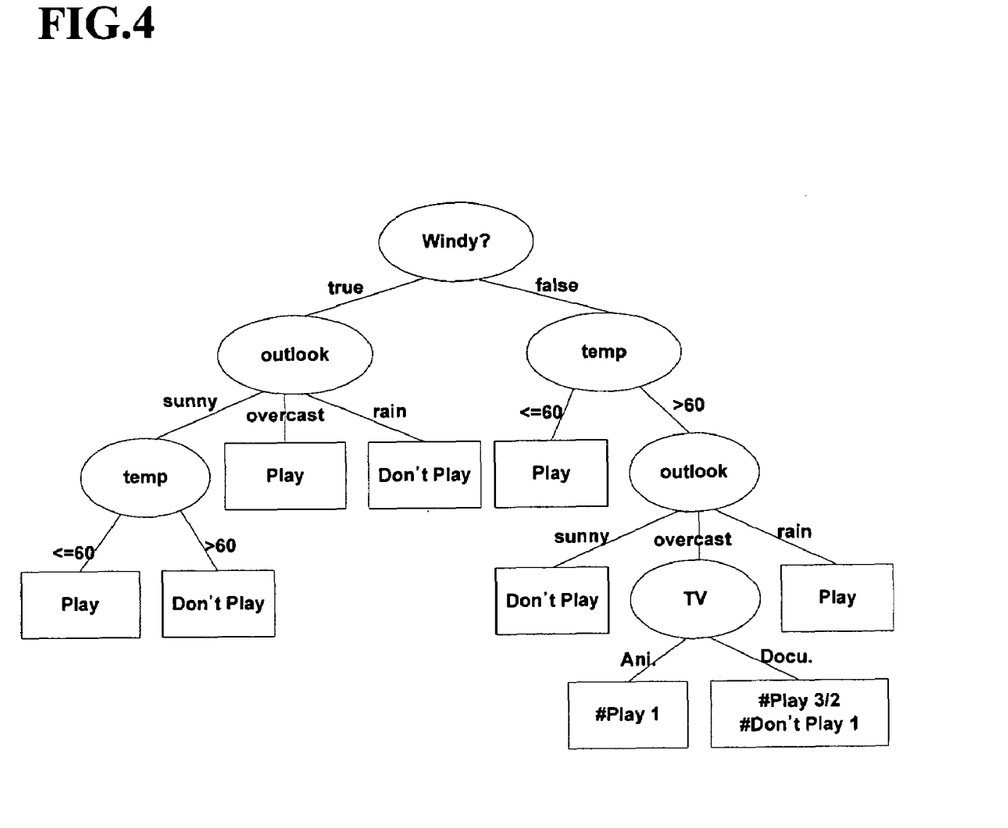
FIG. 4 shows a decision tree according to the exemplary embodiment of the present invention.
Figure 5:
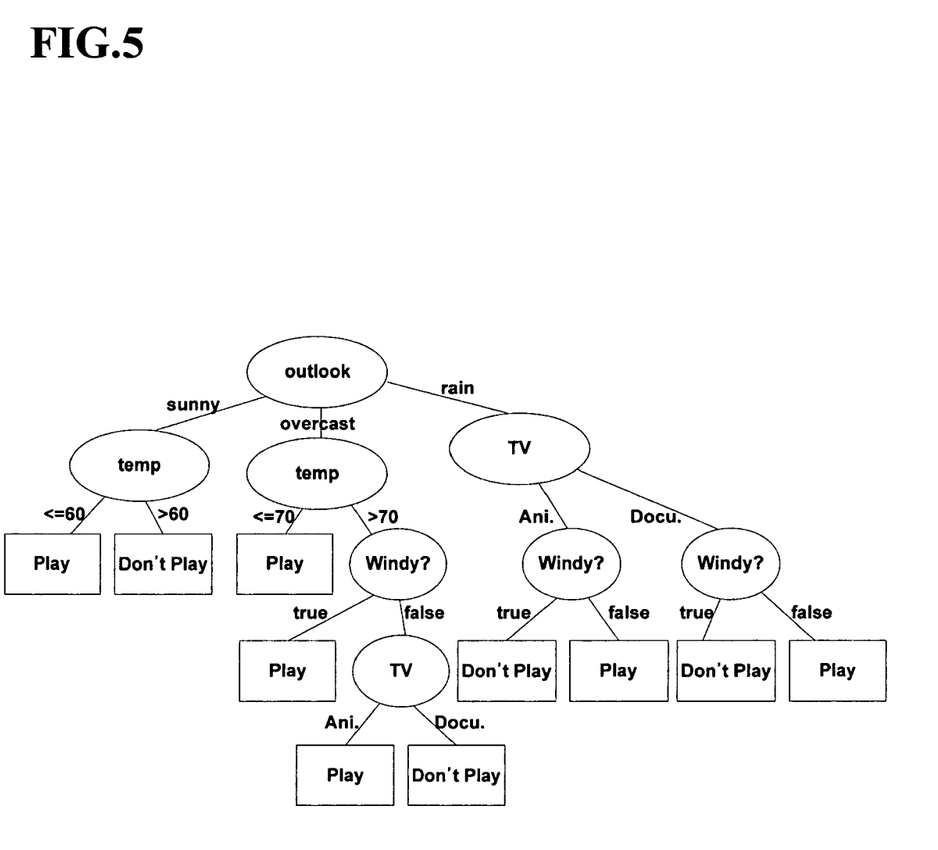
FIG. 5 shows a decision tree having different weight values according to the exemplary embodiment of the present invention.

FIG. 4 shows a decision tree according to the exemplary embodiment of the present invention. FIG. 5 shows a decision tree having different weight values according to the exemplary embodiment of the present invention.

To form the decision tree shown in FIG. 4 and FIG. 5, data shown in Table 3 will now be described.

TABLE 3

| Event # | Weight (i) | Outlook | | | Temp(° F.) | | | Windy? | | Class | |
|---|---|---|---|---|---|---|---|---|---|---|---|
| | | sunny | overcast | rain | 60 | 70 | 80 | true | false | Play | Don't Play |
| 1 | 30 | 1 | 0 | 0 | 0 | 1 | 0 | ½ | ½ | ⅔ | ⅓ |
| 2 | 1 | 1 | 0 | 0 | 1 | 0 | 0 | 1 | 0 | 1 | 0 |
| 3 | 1 | 0 | 1 | 0 | 0 | 0 | 1 | 0 | 1 | 1 | 0 |
| 4 | 1 | 0 | 0 | 1 | 1 | 0 | 0 | 1 | 0 | 0 | 1 |
| 5 | 1 | 0 | 0 | 1 | 0 | 1 | 0 | 0 | 1 | 1 | 0 |
| 6 | 1 | 0 | 0 | 1 | 0 | 0 | 1 | 1 | 0 | 0 | 1 |

Data shown in Table 3 may be generated by those skilled in the art, and they may be generated by the decision tree. Before describing the table entries shown in Table 3 when they are generated by the decision tree, the table entries generated by those skilled in the art will be described first.

When those skilled in the art sets probability of "Play" as ⅔ regardless of "Windy" when the outlook is sunny and temp is 70° F., data are given as a highest column (Event #1) shown in Table 3. In addition, respective rows of respective tables have respective weight values for indicating importance of corresponding data samples.

That is, when the weight value of each data sample collected by the sensor is "1", the weight values shown in Table 3 indicate the importance of the data generated by those skilled in the art, compared to normal data samples. For example, the weight value of the data sample of the Event #1 by those skilled in the art is "30", which corresponds to 30 data samples collected by the sensors.

Therefore, the number of events may differ from the number of samples. In Table 3, the number of data samples is 35, but the number of events is 6. In the exemplary embodiment of the present invention, |T| denotes the number of samples of a data set T, and p denotes the number of events.

Accordingly, by using the weight values, the entropy equation referred to while describing FIG. 1 to FIG. 3 and data parameters for the entropy equation may be modified as follows.

$$\text{Gain\_ratio}(A) = \text{Gain}(A)/\text{split\_info}(A) \quad \text{[Equation 5]}$$

Here, Gain(A) is obtained by "info(T)−info$_A$(T)", and A denotes the attribute.

That is, Gain_ratio(A) is obtained by dividing a gain value of the attribute A by the partitioning information value. info (T) for obtaining the entropy value is given as Equation 6.

$$\text{info}(T) = -\sum_{i=1}^{k} freq(C_i, T)/|T| \times \log_2(freq(C_i, T)/|T|) \quad \text{[Equation 6]}$$

Here, k denotes the number of classes. The information value info(T) of the set T is obtained by a sum of values obtained by multiplying values ($freq(C_i, T)/|T|$) obtained by dividing the number of the samples in the classes of the set T by the number of events having the weight value 1, and logarithmic values of the values ($freq(C_i, T)/|T|$).

$$\text{info}(T_{Aj}) = -\sum_{i=1}^{k} freq(C_i, T_{Ai})/|T_{Ai}| \times \log_2(freq(C_i, T_{Aj})/|T_{Aj}|)$$

$\text{info}_A(T)$ is given as Equation 7.

$$\text{info}_A(T) = \sum_{j=1}^{n} |T_{Aj}|/|T| \times \text{info}(T_{Aj}) \quad \text{[Equation 7]}$$

That is, a plurality of event values included in the attributes in the set T are divided by the set T and multiplied by the information value for the plurality of event values included in the attributes in the set T, and obtained values are added to obtain $\text{info}_A(T)$.

split_info(A) is given as Equation 8.

$$\text{split\_info}(A) = -\sum_{j=1}^{n} |T_{Aj}|/|T| \times \log_2(|T_{Aj}|/|T|) \quad \text{[Equation 8]}$$

Data values for obtaining Equation 5 to Equation 8 will now be described.

①T denotes a set of training events.

②$C_1, C_2, C_3, \ldots, C_{k-1}$, and $C_k$ respectively denote classes.

Here, k denotes the number of classes. The classes in Table 3 according to the exemplary embodiment of the present invention are "Play" and "Don't Play", and therefore k is 2.

③$C_1(m), C_2(m), C_3(m), \ldots, C_{k-1}(m)$, and $C_k(m)$ respectively denote class membership values.

Here, $C_i(m)$ denotes a membership value for a $C_i$ class at an $m^{th}$ event.

For example, $C_{play}$ 1 is ⅔ in Table 3. In this case, $$\sum_{i=1}^{k} C_i(m) = 1.$$

④$O_{A1}(m), O_{A2}(m), O_{A3}(m), \ldots, O_{A(n-1)}(m)$, and $O_{An}(m)$ respectively denote outcome membership values of a given attribute A.

That is, $O_{Aj}(m)$ denotes a value of an outcome j of the attribute A of the $m^{th}$ event. For example, $O_{WindyTrue}$ 1 is ½, and $O_{WindyFalse}$ 1 is ½ in Table 3. In this case, $$\sum_{j=1}^{n} O_{Aj}(m) = 1.$$

That is, a sum of the plurality of output membership values is 1.

⑤$T_{Aj}$ denotes a subset having the outcome value j for the single attribute A in the set T.

For example, since the outcome values are "sunny", "overcast", and "rain" when the attribute is the outcome, three subsets are provided.

⑥) p denotes the number of events in the set T.

Since the number of events is 6 in Table 3, p is 6.

⑦ freq ($C_i$, T) denotes the number of samples in the class $C_i$ in the set T, which is given as $$\sum_{m=1}^{p(T)} \text{Weigh}(m) \times C_i(m)$$

in the exemplary embodiment of the present invention. That is, freq ($C_i$, T) is the number of samples having a value obtained by a sum of values obtained by multiplying the weight values by the classes in the class $C_i$. In the exemplary embodiment of the present invention, freq (Play, T) is 23, and freq (Don't Play, T) is 12.

In addition, freq ($C_i$, $T_{Aj}$) denotes the number of the class Ci in the set $T_{Aj}$. In this case, $$\sum_{m=1}^{p(t)} \text{Weigh}(m) \times C_i(m) \times O_{Aj}(m).$$

In the exemplary embodiment of the present invention, freq (Play, WindyTrue)=11, freq (Play, WindyFalse)=12, freq (Don't Play, WindyTrue)=7, and freq (Don't Play, WindyFalse)=5.

⑧|T| denotes the number of all samples.

Here, the sample indicates the event having the weight value 1. Accordingly, when an event has the weight value W (e.g., the Event #1 in Table 3), there are W samples having the same tuple and the same event.

⑨|$T_{Aj}$| denotes the number of samples of $T_{Aj}$.

In this case, |$T_{Aj}$| is calculated by adding values obtained by multiplying the weight value Weight (m) by each outcome probability value $O_{Aj}(m)$ for the plurality of events in the set $T_{Aj}$, in a like manner of |T|.

$$|T_{Aj}| = \sum_{m=1}^{p(T_{Aj})} \text{Weight}(m) \times O_{Aj}(m)$$

In the exemplary embodiment of the present invention, |$T_{WindyTrue}$|=18 and |$T_{WindyFalse}$|=17.

As described above, the decision tree may be formed by using the newly defined data values, and Equation 5 to Equation 8. In addition, a new decision tree may be formed by establishing an event order by using the previously generated decision tree, which will be described with reference to FIG. 3.

When the outlook is rain in the decision tree shown in FIG. 2 and a pruning operation is performed without further generating a tree, the tree as shown in FIG. 3 is generated. When a user has the tree shown in FIG. 3 without any other information, Table 4 is formed by using the tree shown in FIG. 3 to show rules of lowest nodes of the tree shown in FIG. 3. Here, an order of the events is set from the left lowest node, but it is not limited thereto.

TABLE 4

| Event # | Weight (i) | Outlook | | | Temp(° F.) | | | Windy? | | Class | |
|---|---|---|---|---|---|---|---|---|---|---|---|
| | | sunny | overcast | rain | 60 | 70 | 80 | true | false | Play | Don't play |
| 1 | 1 | 1 | 0 | 0 | 1 | 0 | 0 | ½ | ½ | 1 | 0 |
| 2 | 1 | 1 | 0 | 0 | 0 | ½ | ½ | ½ | ½ | 0 | 1 |
| 3 | 1 | 0 | 1 | 0 | ⅓ | ⅓ | ⅓ | ½ | ½ | 1 | 0 |
| 4 | 3 | 0 | 0 | 1 | ⅓ | ⅓ | ⅓ | ½ | ½ | ⅓ | ⅔ |

The weight value in Table 4 is the number of samples of the lowest node, and another value may be allocated by a table designer.

Since the attribute of windy is not selected at the left lowest node in FIG. 3, it is a "don't care" attribute. Accordingly, since the windy attribute has the same probability for two values WindyTrue and WindyFalse at the left lowest node, a probability ½ is respectively provided for the two values as shown in "Windy?" of Event #1 shown in Table 4.

When the tree shown in FIG. 3 is generated after the pruning operation is performed while the tree is formed with the data shown in Table 2, the event #2 belongs to a lowest left node in FIG. 3, the event #1 belongs to a next node to the lowest left node, the events #4, #5, and #6 belong to a lowest right node, and the event #3 belongs to a previous node before the lowest right node.

Data may be further minutely formed according to the exemplary embodiment of the present invention. For example, since the right lowest node shown in FIG. 2 is included in the events #4, #5, and #6, the probability of WindyTrue is ⅔, and the probability of WindyFalse is ⅓. Therefore, by using statistics of data in the respective lower nodes, Table 5 may be formed.

ment. For example, it is assumed that nominal attributes of animation and documentary are additionally provided by a sensor TV in Table 5.

The new attributes are additionally provided because a previous data event set is not enough to perform classification, environments including a society and a culture change. Accordingly, it is assumed that data shown in Table 6 are additionally collected.

TABLE 6

| Outlook | Temp(° F.) | Windy? | TV | Class |
|---|---|---|---|---|
| sunny | 60 | true | animation | Play |
| overcast | 80 | false | documentary | Don't Play |
| overcast | 70 | false | documentary | Play |
| rain | 60 | true | animation | Don't Play |
| rain | 80 | true | animation | Don't Play |

TABLE 5

| Event # | Weight (i) | Outlook | | | Temp(° F.) | | | Windy? | | Class | |
|---|---|---|---|---|---|---|---|---|---|---|---|
| | | sunny | overcast | rain | 60 | 70 | 80 | true | false | Play | Don't play |
| 1 | 1 | 1 | 0 | 0 | 1 | 0 | 0 | 1 | 0 | 1 | 0 |
| 2 | 1 | 1 | 0 | 0 | 0 | 1 | 0 | 0 | 1 | 0 | 1 |
| 3 | 1 | 0 | 1 | 0 | 0 | 0 | 1 | 0 | 1 | 1 | 0 |
| 4 | 3 | 0 | 0 | 1 | ⅓ | ⅓ | ⅓ | ⅔ | ⅓ | ⅓ | ⅔ |

Here, weight values different from those of Table 5 may be allocated by the table designer. A method for forming a table when the table is designed and a new sensor generates a new attribute will now be described.

Here, it is assumed that a new sensor is provided and the number of attributes is increased in the ubiquitous environ- Data shown in Table 6 may be shown as Table 7. In this case, the event result for the attribute of "don't care" among the events of the collected data may be set as the same probability value, and the weight value may be differently allocated by a designer, but it is not limited thereto.

TABLE 7

| Event # | Weight | Outlook | | | Temp(° F.) | | | Windy? | | TV | | Class | |
|---|---|---|---|---|---|---|---|---|---|---|---|---|---|
| | | sunny | overcast | rain | 60 | 70 | 80 | true | false | ani. | docu. | Play | Don't Play |
| 1 | 1 | 1 | 0 | 0 | 1 | 0 | 0 | 1 | 0 | 1 | 0 | 1 | 0 |
| 2 | 1 | 0 | 1 | 0 | 0 | 0 | 1 | 0 | 1 | 0 | 1 | 0 | 1 |
| 3 | 1 | 0 | 1 | 0 | 0 | 1 | 0 | 0 | 1 | 0 | 1 | 1 | 0 |
| 4 | 1 | 0 | 0 | 1 | 1 | 0 | 0 | 1 | 0 | 1 | 0 | 0 | 1 |
| 5 | 1 | 0 | 0 | 1 | 0 | 0 | 1 | 1 | 0 | 1 | 0 | 0 | 1 |

A method for forming a data table by additionally providing new attributes to the existing decision tree when a data event set generated by the new sensor is input will now be described.

In general, the existing data are used, or the existing tree is provided at a starting line and new data are provided to the tree, in a rule refinement method. However, there is a problem in the rule refinement method, in that the rule refinement method is used only when there are existing data, or newly collected data may not be sufficiently used since exceptional data among the newly collected data are used while the existing tree is mostly maintained. Such a problem is referred to a rule refinement problem.

To solve the above problem, a new table as shown in Table 8 is formed with reference to FIG. 2. For convenience of descriptions, the attributes that are not selected at the respective lowest nodes are assumed to be "don't care" and to have the same probability. In addition, data are expressed from the left lowest node to the right lowest node in FIG. 2, but it is not limited thereto.

Since the class is clearly divided at the other lowest nodes except those of TV, the number of samples belonging to the class is omitted.

As shown in Table 9, the number of samples may not be an integer. In this case, the tree may be formed as shown in FIG. 4 in an expanded data expression method. That is, whether or not the data newly collected by the sensor may include a new attribute, the tree may be consistently changed by using a measuring operation and the data expression method according to the exemplary embodiment of the present invention.

Since the new attribute has not been included in the existing data, rules of the lowest nodes of the tree formed by the existing data show "don't care".

TABLE 8

| Event # | Weight | Outlook | | | Temp(° F.) | | | Windy? | | TV | | Class | |
|---|---|---|---|---|---|---|---|---|---|---|---|---|---|
| | | sunny | overcast | rain | 60 | 70 | 80 | true | false | ani. | docu. | Play | Don't Play |
| 1 | 1 | 1 | 0 | 0 | 1 | 0 | 0 | 1 | 0 | 1 | 0 | 1 | 0 |
| 2 | 1 | 0 | 1 | 0 | 0 | 0 | 1 | 0 | 1 | 0 | 1 | 0 | 1 |
| 3 | 1 | 0 | 1 | 0 | 0 | 1 | 0 | 0 | 1 | 0 | 1 | 1 | 0 |
| 4 | 1 | 0 | 0 | 1 | 1 | 0 | 0 | 1 | 0 | 1 | 0 | 0 | 1 |
| 5 | 1 | 0 | 0 | 1 | 0 | 0 | 1 | 1 | 0 | 1 | 0 | 0 | 1 |

Table 7 and Table 8 are combined to form Table 9.

TABLE 9

| Event # | Weight | Outlook | | | Temp(° F.) | | | Windy? | | TV | | Class | |
|---|---|---|---|---|---|---|---|---|---|---|---|---|---|
| | | sunny | overcast | rain | 60 | 70 | 80 | true | false | ani. | docu. | Play | Don't Play |
| 1 | 1 | 1 | 0 | 0 | 1 | 0 | 0 | 1 | 0 | 1 | 0 | 1 | 0 |
| 2 | 1 | 0 | 1 | 0 | 0 | 0 | 1 | 0 | 1 | 0 | 1 | 0 | 1 |
| 3 | 1 | 0 | 1 | 0 | 0 | 1 | 0 | 0 | 1 | 0 | 1 | 1 | 0 |
| 4 | 1 | 0 | 0 | 1 | 1 | 0 | 0 | 1 | 0 | 1 | 0 | 0 | 1 |
| 5 | 1 | 0 | 0 | 1 | 0 | 0 | 1 | 1 | 0 | 1 | 0 | 0 | 1 |
| 6 | 1 | 1 | 0 | 0 | 1 | 0 | 0 | 1/2 | 1/2 | 1/2 | 1/2 | 1 | 0 |
| 7 | 1 | 1 | 0 | 0 | 0 | 1/2 | 1/2 | 1/2 | 1/2 | 1/2 | 1/2 | 0 | 1 |
| 8 | 1 | 0 | 1 | 0 | 1/3 | 1/3 | 1/3 | 1/2 | 1/2 | 1/2 | 1/2 | 1 | 0 |
| 9 | 2 | 0 | 0 | 1 | 1/3 | 1/3 | 1/3 | 1 | 0 | 1/2 | 1/2 | 0 | 1 |
| 10 | 1 | 0 | 0 | 1 | 1/3 | 1/3 | 1/3 | 0 | 1 | 1/2 | 1/2 | 1 | 0 |

By such a table combining process, it may be determined whether the conventional data table is changed according to a data structure according to the exemplary embodiment of the present invention. That is, when the table is changed according to the exemplary embodiment of the present invention, the new processor may adaptively process an additional condition.

When a tree is formed based on the weight values in Table 9, it may be shown as FIG. 4. In this case, since the class is not clearly divided at the lowest node of "TV", the class name and the number of samples belonging to the class are shown.

In this case, since a new attribute may be hardly selected at upper nodes of a new tree formed by using the newly collected data, the new attribute of the newly formed tree is selected at a low level of the tree as shown in FIG. 4. When the new attribute is an attribute having a high reliability, the weight value of the newly collected data is increased such that a new attribute may be selected at an upper level of the tree. In Table 10, the weight value of event #8 shown in Table 9 is increased from 1 to 4 according to the exemplary embodiment of the present invention.

TABLE 10

| Event # | Weight | Outlook | | | Temp(° F.) | | | Windy? | | TV | | Class | |
|---|---|---|---|---|---|---|---|---|---|---|---|---|---|
| | | sunny | overcast | rain | 60 | 70 | 80 | true | false | ani. | docu. | Play | Don't Play |
| 1 | 1 | 1 | 0 | 0 | 1 | 0 | 0 | 1 | 0 | 1 | 0 | 1 | 0 |
| 2 | 1 | 0 | 1 | 0 | 0 | 0 | 1 | 0 | 1 | 0 | 1 | 0 | 1 |
| 3 | 1 | 0 | 1 | 0 | 0 | 1 | 0 | 0 | 1 | 0 | 1 | 1 | 0 |
| 4 | 1 | 0 | 0 | 1 | 1 | 0 | 0 | 1 | 0 | 1 | 0 | 0 | 1 |
| 5 | 1 | 0 | 0 | 1 | 0 | 0 | 1 | 1 | 0 | 1 | 0 | 0 | 1 |
| 6 | 1 | 1 | 0 | 0 | 1 | 0 | 0 | 1/2 | 1/2 | 1/2 | 1/2 | 1 | 0 |
| 7 | 1 | 1 | 0 | 0 | 0 | 1/2 | 1/2 | 1/2 | 1/2 | 1/2 | 1/2 | 0 | 1 |
| 8 | 4 | 0 | 1 | 0 | 1/3 | 1/3 | 1/3 | 1/2 | 1/2 | 1/2 | 1/2 | 1 | 0 |
| 9 | 2 | 0 | 0 | 1 | 1/3 | 1/3 | 1/3 | 1 | 0 | 1/2 | 1/2 | 0 | 1 |
| 10 | 1 | 0 | 0 | 1 | 1/3 | 1/3 | 1/3 | 0 | 1 | 1/2 | 1/2 | 1 | 0 |

The decision tree generated based on the Table 10 is shown as FIG. 5. As shown in FIG. 5, the new attribute is selected in the middle of the tree. Accordingly, when the tree is formed while varying the weight values of the newly collected data from a high value to a low value according to a level of the tree, the attribute may be selected in the middle of the tree.

Among the plurality of trees generated while appropriately varying the weight values according to the level of the tree, a tree that is most appropriately classified for a test data set is selected. In general, the weight value is decreased as the level of the tree is increased, but it is not limited thereto.

The number of classes of the respective lowest nodes is omitted since the classes of the nodes are clearly divided according to a result. In addition, the decision tree shown in FIG. 5 may be further simplified when the tree is pruned at a predetermined level. When information of {rain, 90, false, animation} is collected by the sensors, and outcome values are calculated by using the simplified tree, the result "Play" may be obtained.

A method for generating the decision tree according to the exemplary embodiment of the present invention will now be described with reference to FIG. 6.

Figure 6:
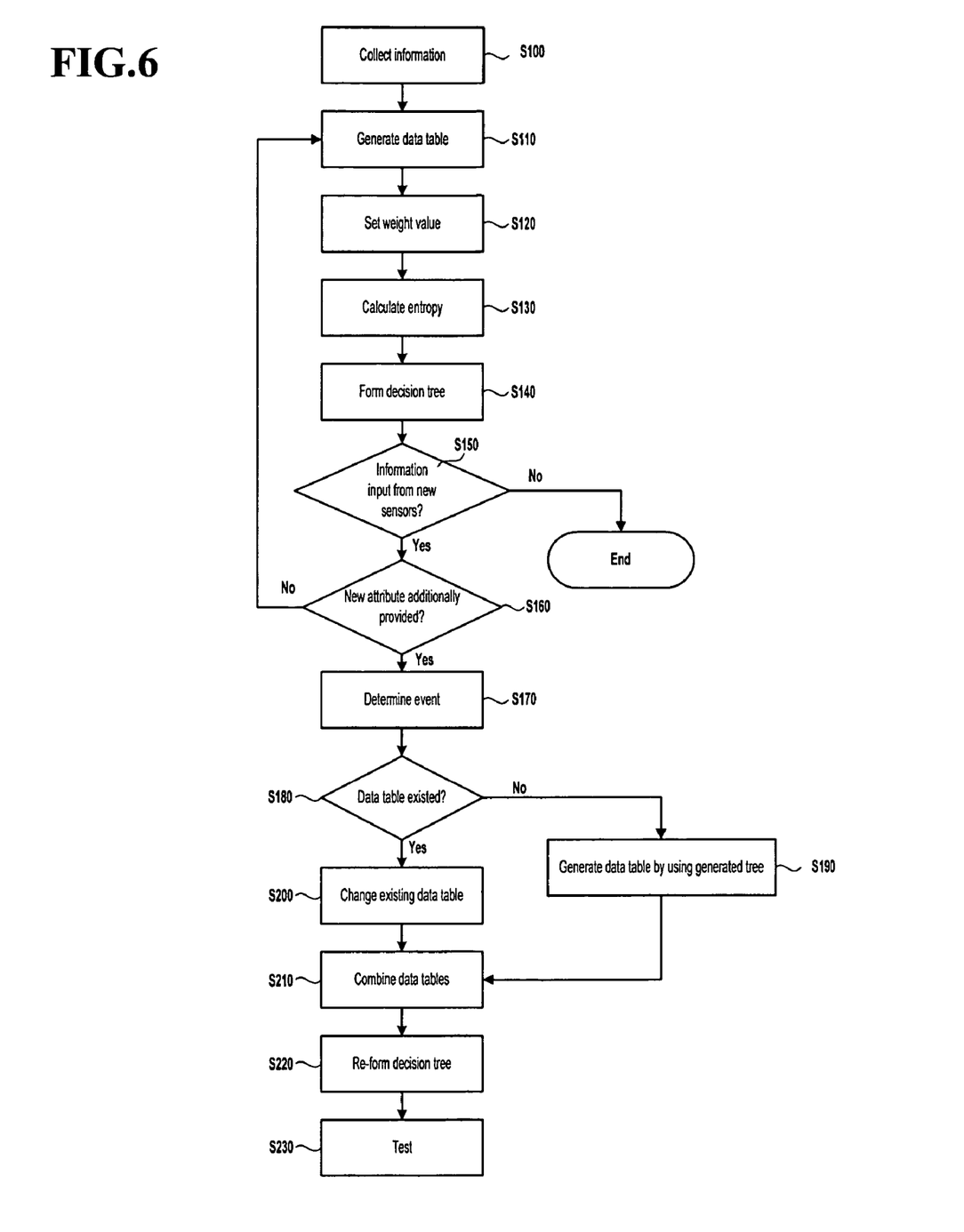
FIG. 6 shows a flowchart representing a method for generating the decision tree according to the exemplary embodiment of the present invention.

FIG. 6 shows a flowchart representing a method for generating the decision tree according to the exemplary embodiment of the present invention.

Firstly, information is collected by a plurality of sensors in the ubiquitous environment in step S100. The collected analog information is quantized, converted to digital data, and formed as a data table based on a decision tree algorithm, or a data table is generated by a table designer in step S110. Weight values are set for the digital data formed as the data table in step S120, and an entropy is calculated based on the set weight values in step S130.

After calculating the entropy in step S130, a decision tree is formed based on the calculated entropy value in step S140. In this case, the entropy value is calculated for all attributes to form a final decision tree.

When the decision tree is finally formed in step S140 as described above or there is an existing decision tree, it is determined whether information is input from new sensors in step S150.

When it is determined that there is the information collected from the new sensors, it is determined whether a new attribute is additionally provided in the information in step S160. When it is determined that there is no new attribute, the step S110 is performed to update the decision tree. However, since it is required to update the decision tree when there is a new attribute, events for the collected data are determined in step S170, and a data table for the new attribute is generated.

When determining the events, respective rows of the table have weight values indicating importance of corresponding data. After determining the event, it is determined whether there is an existing data table in step S180, since it is easy to update the tree when the new attribute is provided to the existing decision tree to update the decision tree, or when there is a data table for the existing decision tree.

When there is a data table for the existing decision tree, the data table is changed according to the exemplary embodiment of the present invention in step S200. However, when there is no data table, the data table is generated in step S190 by using the generated tree. In this case, the generated data table includes no new attribute.

After the existing data table is changed in step S200 or the data table is generated by using the generated tree in step S190, the data table is combined in step S210 with the data table generated in step S170 for the new attribute. The data tables are combined in step S210 while the attribute that is not selected at the lowest node is regarded as "don't care".

After combining the data tables in step S210, the decision tree is re-formed based on the combined table in step S220. Since the re-formed decision tree is based on the table formed by an extended data expression method according to the exemplary embodiment of the present invention, it is easy to update a tree for data to be collected by a new sensor. After re-forming the tree in step S220, a test is performed by using predetermined data in the data table in step S230.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since a method for expressing the data event set and a measure for forming the decision tree are newly defined, the decision tree may be flexibly updated when a new sensor (i.e., a new attribute) is additionally provided.

In addition, a new data set and a new decision tree may be generated by using a rule generated based on the existing data without a data set.

Further, the data may be expanded, and the decision tree may be efficiently formed.

What is claimed is:

1. A computer-implemented method for forming a decision tree for use with an inference engine in a ubiquitous environment having a plurality of sensors, the method comprising:
   a) generating a data table for a set of events based on information collected by at least one of the sensors;
   b) establishing a weight value for each event in the set, and calculating an entropy based on the established weight value, wherein the entropy is a measure for classifying the information collected by the sensor into respective classes; and
   c) forming the decision tree for the collected information based on the calculated entropy;
   wherein the weight value in b) indicates importance of the event in the set;
   wherein the decision tree infers a low level data context inputted from the sensors as a high level context to be entered into a knowledge system using the inference engine; and
   wherein the entropy in b) is obtained by the following equation:

Gain_ratio (A)=Gain (A)/split_info (A)

where
   Gain_ratio(A) is the entropy;
   Gain(A) is a gain value of an attribute A, wherein the attribute A is a distinguisher for distinguishing the information collected by the at least one sensor; and
   split_info(A) is a partitioning information value of the attribute A.

2. The method of claim 1, wherein the gain value Gain(A) of the attribute A is a difference between an information value info(T) of a set T of p events and an information value $info_A(T)$ of the attribute A in the entire set T, wherein information on the p events of the set T is collected by the at least one sensor.

3. The method of claim 2, wherein the information value info(T) of the set T is obtained by the following equation:

$$info(T) = -\sum_{i=1}^{k} freq(C_i, T)/|T| \times \log_2(freq(C_i, T)/|T|)$$

where
freq($C_i$, T) is the number of samples in class $C_i$, among k classes $C_1$ through $C_k$ of the set T, wherein the samples are events having a weight value of 1, and
|T| is the number of all samples in the set T.

4. The method of claim 3, wherein the information value $info_A(T)$ of the attribute A in the entire set T is determined as follows:

$$info_A(T) = \sum_{j=1}^{n} |T_{Aj}|/|T| \times info(T_{Aj})$$

where
$T_{Aj}$ is a subset of events having an outcome value j for the attribute A in the set T,
$|T_{Aj}|$ is the number of samples in $T_{Aj}$, and
info($T_{Aj}$) is the information value of the subset $T_{Aj}$.

5. The method of claim 3, further comprising defining at least one of:
   a class membership value $C_i(m)$ indicating a probability of class $C_i$ among k classes $C_1$ though $C_k$ of the set T at an $m^{th}$ event;
   an outcome membership value $O_{Aj}(m)$ indicating a value of an outcome j of the attribute A at the $m^{th}$ event.

6. The method of claim 5, wherein $$\sum_{i=1}^{k} C_i(m) = 1.$$

7. The method of claim 5, wherein freq($C_i$, T) is obtained as $$\sum_{m=1}^{p(T)} Weigh(m) \times C_i(m)$$

where weight(m) is the weight value assigned to the $m^{th}$ event.

8. The method of claim 7, wherein the number $|T_{Aj}|$ of samples in $T_{Aj}$, which is a subset of events having an outcome j for the attribute A in the set T, is obtained as follows:

$$|T_{Aj}| = \sum_{m=1}^{p(T_{Aj})} Weight(m) \times O_{Aj}(m).$$

9. The method of claim 2, wherein the partitioning information value split_info(A) of the attribute A is obtained as follows:

$$split\_info(A) = -\sum_{j=1}^{n} |T_{Aj}|/|T| \times \log_2(|T_{Aj}|/|T|)$$

where
|T| is the number of all samples in the set T, wherein the samples are events having a weight value of 1,
$T_{Aj}$ is a subset of events having an outcome j for the attribute A in the set T, and
$|T_{Aj}|$ is the number of samples in $T_{Aj}$.

* * * * *